United States Patent
Mateer

(10) Patent No.: US 11,234,538 B2
(45) Date of Patent: Feb. 1, 2022

(54) MOUNTING BRACKET

(71) Applicant: Ryan Andrew Mateer, San Clemente, CA (US)

(72) Inventor: Ryan Andrew Mateer, San Clemente, CA (US)

( * ) Notice: Subject to any disclaimer, the term of this patent is extended or adjusted under 35 U.S.C. 154(b) by 99 days.

(21) Appl. No.: 16/746,665

(22) Filed: Jan. 17, 2020

(65) Prior Publication Data

US 2020/0229620 A1 Jul. 23, 2020

Related U.S. Application Data

(60) Provisional application No. 62/795,261, filed on Jan. 22, 2019.

(51) Int. Cl.
| | |
|---|---|
| F16M 13/00 | (2006.01) |
| A47G 1/16 | (2006.01) |
| F16M 13/02 | (2006.01) |
| F24F 13/20 | (2006.01) |
| F21V 21/04 | (2006.01) |

(52) U.S. Cl.
CPC .......... *A47G 1/1633* (2013.01); *F16M 13/02* (2013.01); *F16M 13/027* (2013.01); *F24F 13/20* (2013.01); *F21V 21/04* (2013.01)

(58) Field of Classification Search
None
See application file for complete search history.

(56) References Cited

U.S. PATENT DOCUMENTS

| | | | | |
|---|---|---|---|---|
| 7,301,099 | B1 * | 11/2007 | Korcz | H02G 3/14 174/135 |
| 2007/0044401 | A1 * | 3/2007 | Bonshor | A47J 23/00 52/213 |
| 2014/0021313 | A1 * | 1/2014 | Gagne | F16M 13/02 248/205.1 |
| 2016/0305635 | A1 * | 10/2016 | Stathes | F21V 17/101 |
| 2019/0360501 | A1 * | 11/2019 | Karst | F24F 7/06 |

* cited by examiner

*Primary Examiner* — Steven M Marsh
(74) *Attorney, Agent, or Firm* — Polsinelli LLP

(57) ABSTRACT

A bracket that is mounted in a wall or ceiling, and cooperates with an insert that can be adjusted flush with the wall or ceiling surface. Slots in the flange, and dimples in the insert facilitate the flush adjustment.

7 Claims, 5 Drawing Sheets

MOUNTING BRACKET

This application claims the benefit of U.S. Patent Application No. 62/795,261, entitled MOUNTING BRACKET, filed on Jan. 22, 2019, which is incorporated herein in its entirety.

SUMMARY OF THE INVENTION

Many current fixtures that are mounted to walls and ceilings in homes and businesses include decorative cover plates or grates that serve to cover gaps between surrounding wall board and the fixture. The outer surface of those decorative cover plates and grates are not generally flush with the plane of the wall or ceiling. What is needed is a mounting configuration that allows flush mounting of the cover plates or grates, and provides a finished edge so that surface finishing compounds can be troweled level with the edge.

The foregoing specific aspects are illustrative of those which can be achieved and are not intended to be exhaustive or limiting of the possible advantages that can be realized. Thus, the objects and advantages will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

Figure 1:
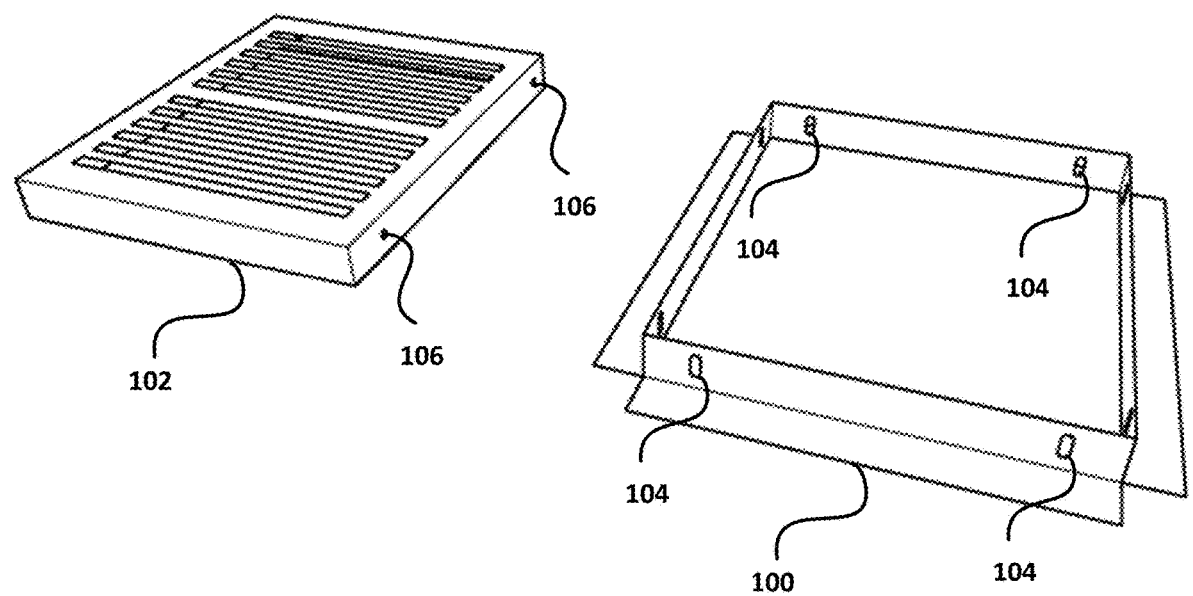
FIG. 1 illustrates embodiments of a mounting bracket according to an embodiment.

Referring to FIG. 1, in one embodiment, a bracket 100 that is mounted to a wall or ceiling, allows an insert 102 to be mounted inside the bracket 100, so that an exterior surface of insert 102 is flush with the wall or ceiling surface.

This is accomplished by configuring bracket 100 with a plurality of elongated slots 104. The elongated slots 104 cooperate with a plurality of raised dimples 106 on the insert 102. The cooperation of raised dimple and elongated slot allows adjustment of insert 102 so that the exterior surface of insert 102 lies flush with the wall or ceiling surface.

As illustrated in FIG. 1, the bracket includes four L-shaped members that are connected at the corners. Some of the flange surfaces on the L-shaped members are connected to a part of the building structure, such as a stud, or rafter, or joist. The other flange surfaces on the L-shaped members extend through an opening in the wall or ceiling covering. The flange surface that extends through the opening, is generally slightly wider than the thickness of the wall or ceiling covering. In this configuration, an edge of the flange is slightly proud of the surface of the wall or ceiling covering, and drywall or joint compound can be troweled on the wall or ceiling covering to fill any gaps leaving a surface that is flush with the edge.

Figure 2:
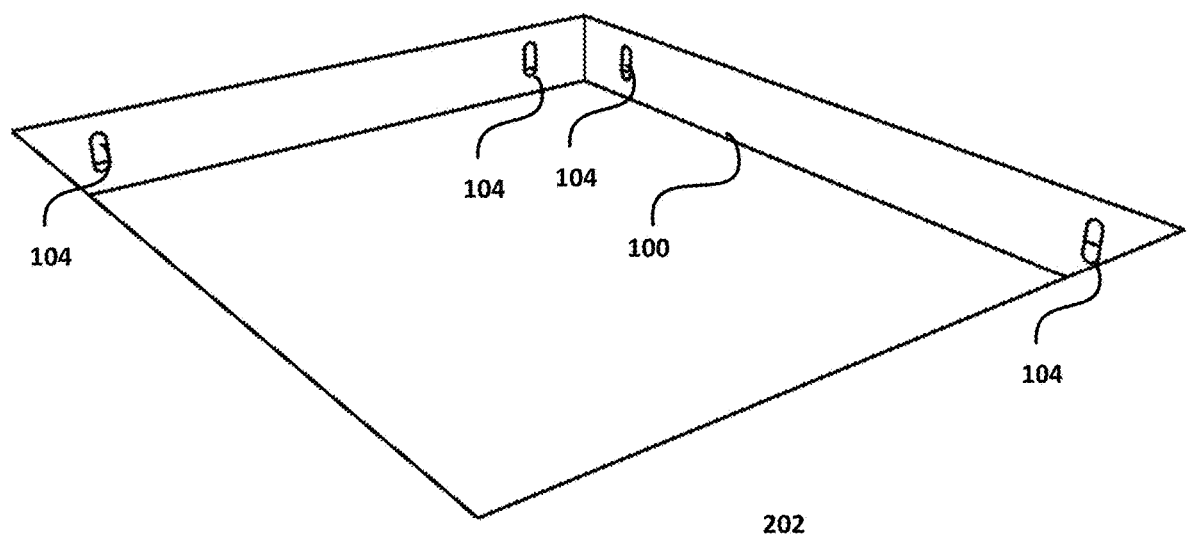
FIG. 2 illustrates embodiments of a mounting bracket according to an embodiment.

As illustrated in FIG. 2, once the drywall or joint compound has been applied, the edge of flange 100 is flush with the wall or ceiling surface 202.

Figure 3:
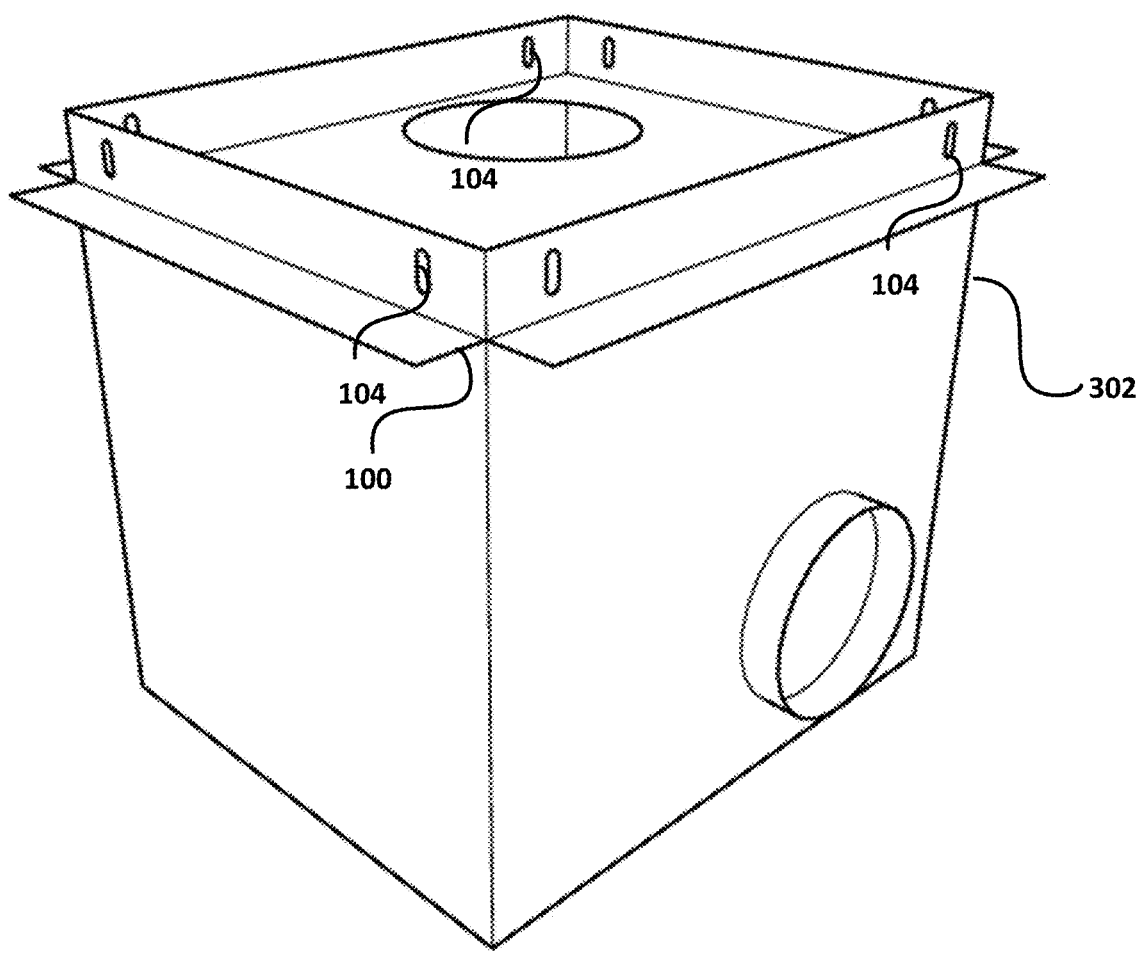
FIG. 3 illustrates embodiments of a mounting bracket according to an embodiment.

As illustrated in FIG. 3, flange 100 can be attached to a fixture 302, such as an exhaust fan. The exhaust fan 302 can be mounted in the ceiling space with the edge of flange 100 flush with the ceiling surface. In other embodiments, fixture 302 might be a light fixture, or speaker, or any other fixture that is typically mounted in the ceiling or on a wall surface.

Figure 4:
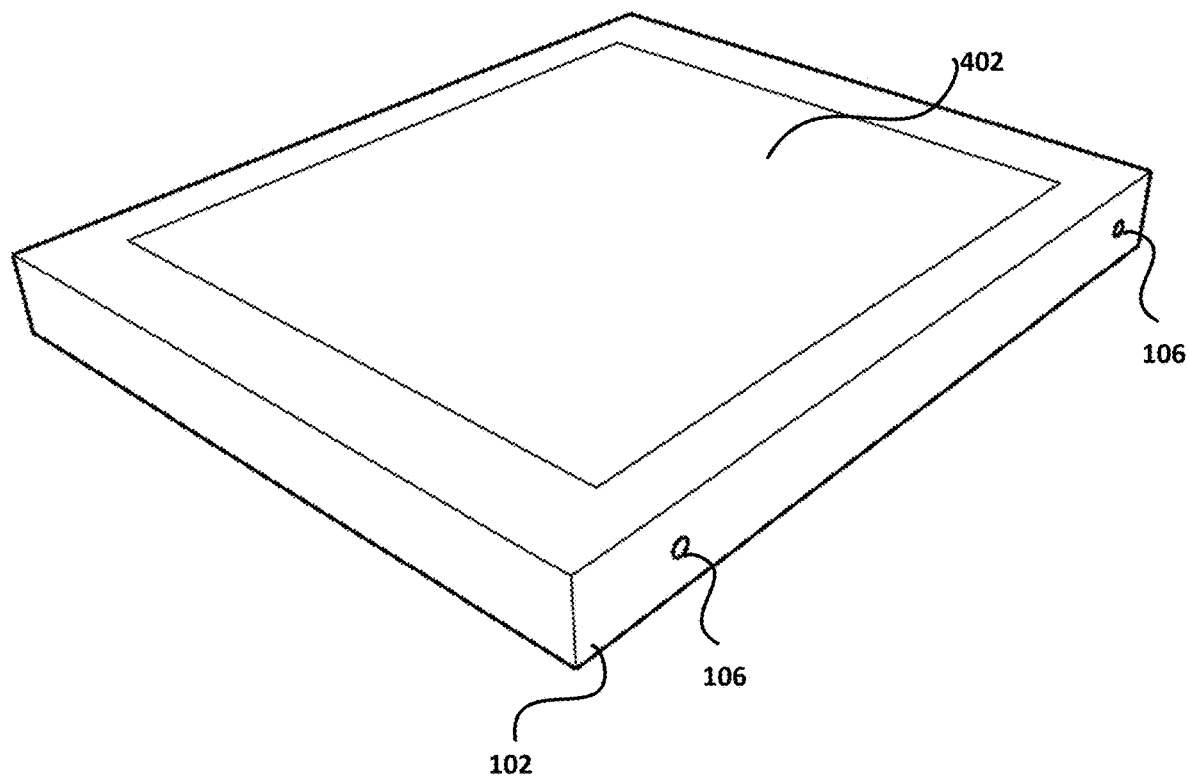
FIG. 4 illustrates embodiments of a mounting bracket according to an embodiment.

In one embodiment, illustrated in FIG. 1, the insert is a vent cover, with slots or perforations to allow passage of air. In another embodiment, illustrated in FIG. 4, the insert is a lighting panel, where the center of insert 102 includes a clear or transparent opening 402 to allow light to exit.

Figure 5:
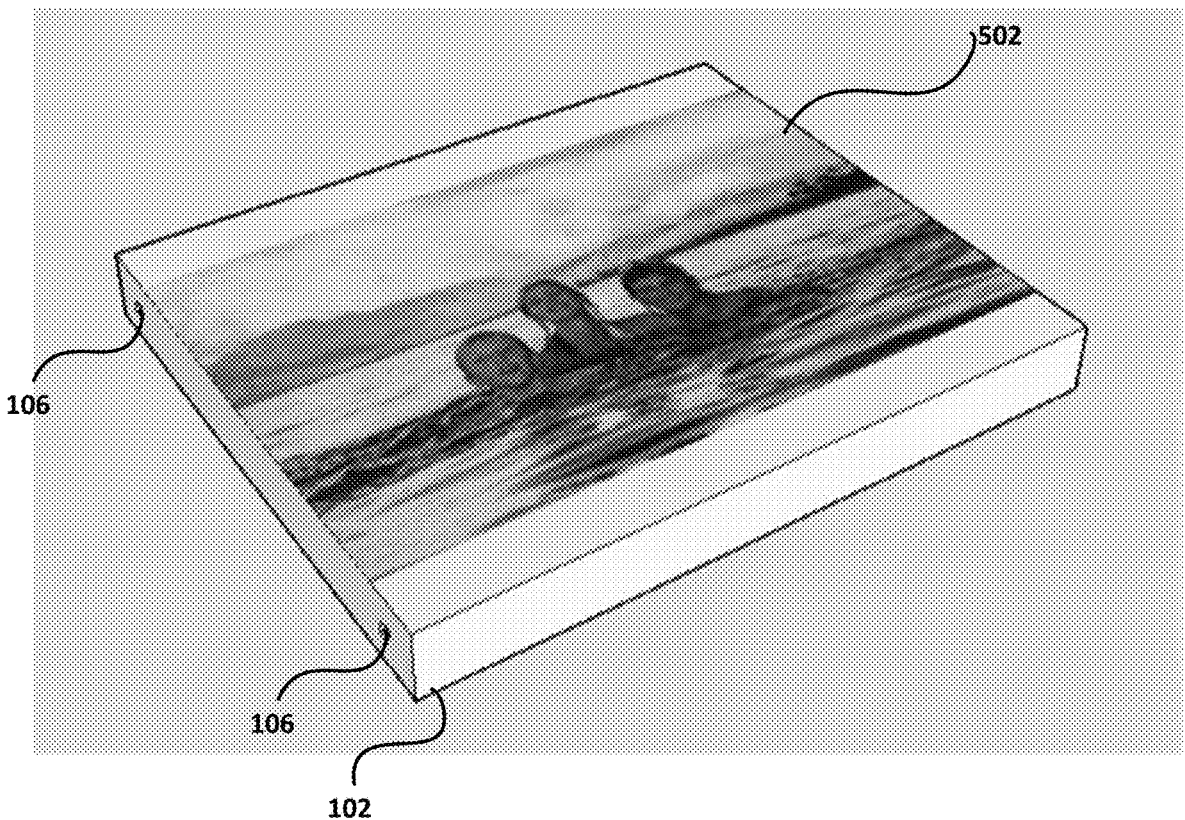
FIG. 5 illustrates embodiments of a mounting bracket according to an embodiment.

In another embodiment, illustrated in FIG. 5, the insert is a piece of artwork 502. In this embodiment, the art work 502 can be inserted into the flange, and then adjusted so it is flush with the wall surface. In other embodiments that are not illustrated, the insert is a switch, such as an electrical switch.

Although illustrative embodiments have been described herein in detail, it should be noted and will be appreciated by those skilled in the art that numerous variations may be made within the scope of this invention without departing from the principle of this invention and without sacrificing its chief advantages. For example features that appear in one embodiment of a particular figure are also applicable to embodiments that are illustrated in other figures.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A bracket comprising:
   an L-shaped first member having a first member first surface and a first member second surface, the first member first surface connected to and substantially orthogonal to the first member second surface, the first member first surface including a first member edge opposite the first member second surface and at least two first member slots, the at least two first member slots configured to cooperate with a first pair of raised dimples on an insert;
   an L-shaped second member having a second member first surface and a second member second surface, the second member first surface connected to and substantially orthogonal to the second member second surface, the second member first surface including a second member edge opposite the second member second surface, a first end of the second member first surface connected to and substantially orthogonal to a first end of the first member first surface;
   an L-shaped third member having a third member first surface and a third member second surface, the third member first surface connected to and substantially orthogonal to the third member second surface, the third member first surface including a third member edge opposite the third member second surface, a second end of the third member first surface connected to and substantially orthogonal to a second end of the second member first surface, the third member first surface including at least two third member slots, the at least two third member slots configured to cooperate with a second pair of raised dimples on the insert; and an L-shaped fourth member having a fourth member first surface and a fourth member second surface, the fourth member first surface connected to and substantially orthogonal to the fourth member second surface, the fourth member first surface including a fourth member edge opposite the fourth member second surface, a first end of the fourth member first surface connected to and substantially orthogonal to a first end of the third member first surface, a second end of the fourth member first surface connected to and substantially orthogonal to a second end of the first member first surface, wherein the bracket is configured such that when installed in a wall or ceiling, the first member edge, the second member edge, the third member edge, and the fourth member edge are slightly proud of an exposed surface of the wall or ceiling.

2. The bracket according to claim 1, further comprising:
the second member first surface including at least two second member slots, the at least two second member slots configured to cooperate with a third pair of raised dimples on the insert; and
the fourth member first surface including at least two fourth member slots, the at least two fourth member slots configured to cooperate with a fourth pair of raised dimples on the insert.

3. The bracket according to claim 1, wherein a width of the first member first surface substantially corresponds to a thickness of standard wall board material.

4. The bracket according to claim 1, wherein the insert is a vent cover with openings.

5. The bracket according to claim 1, wherein the insert is a lighting panel.

6. The bracket according to claim 1, wherein the insert is a framed piece of art.

7. The bracket according to claim 1, wherein the insert is an electrical switch.

* * * * *